Mar. 5, 1929.  B. M. SHIPLEY  1,703,958
CASH REGISTER
Filed Sept. 12, 1923    9 Sheets-Sheet 1
FIG. 1
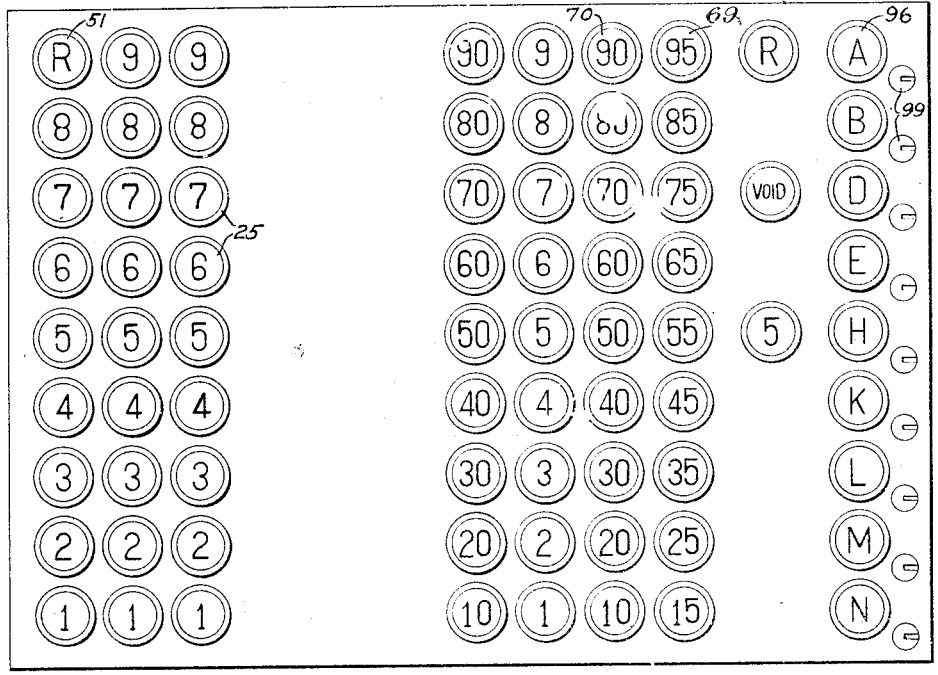
FIG. 2
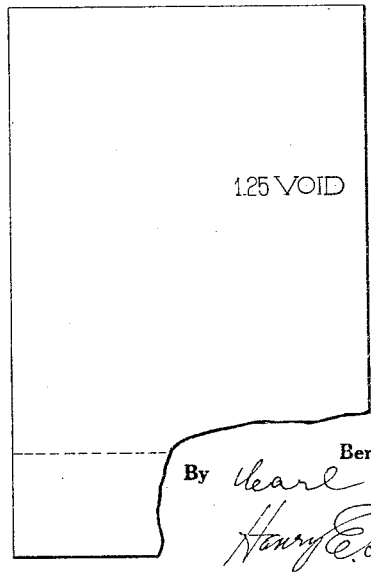
FIG. 3
Inventor
Bernis M. Shipley
By Carl Beust
Henry E. Stauffer
His Attorneys

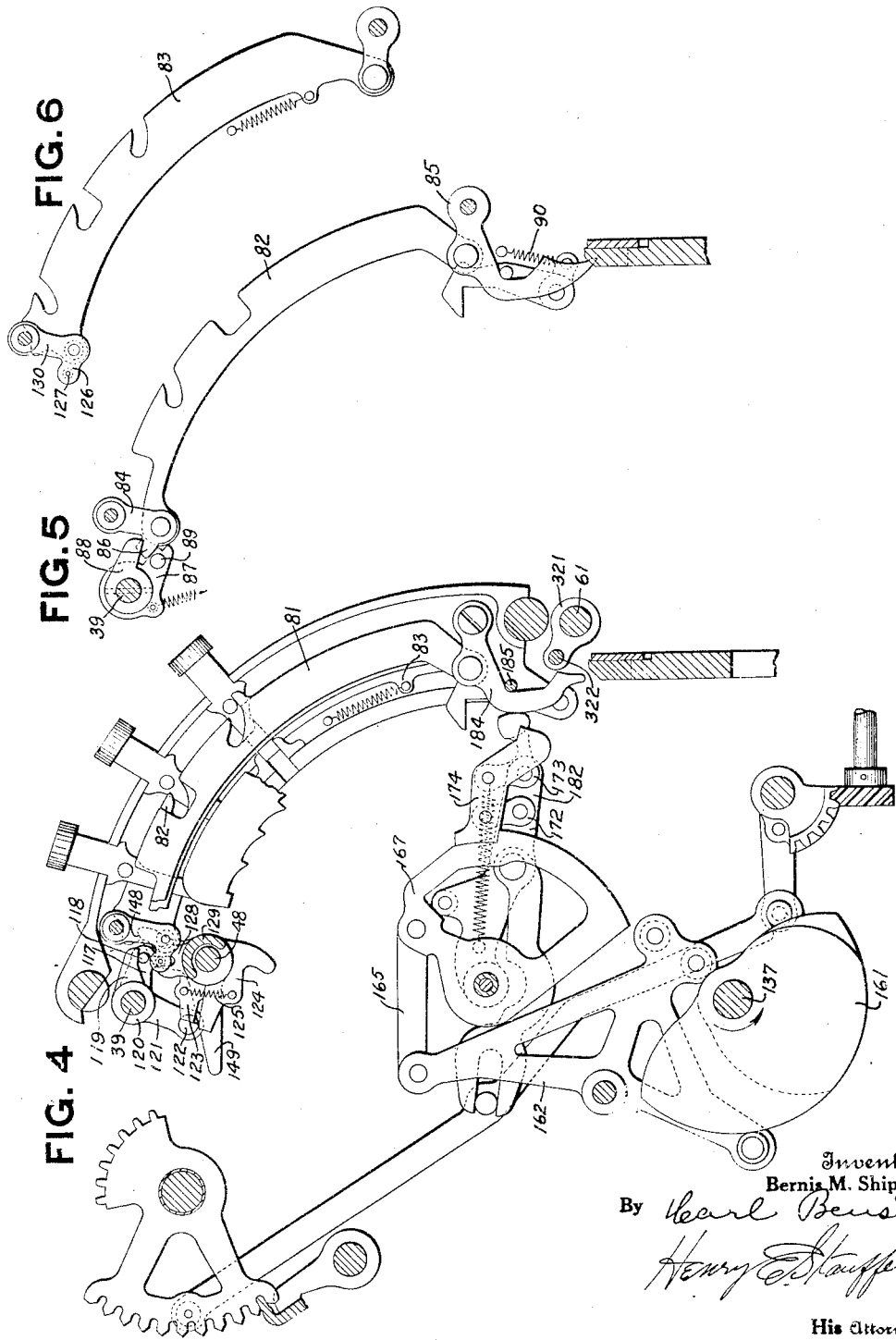

Mar. 5, 1929.　　　B. M. SHIPLEY　　　1,703,958
CASH REGISTER
Filed Sept. 12, 1925　　9 Sheets-Sheet 3
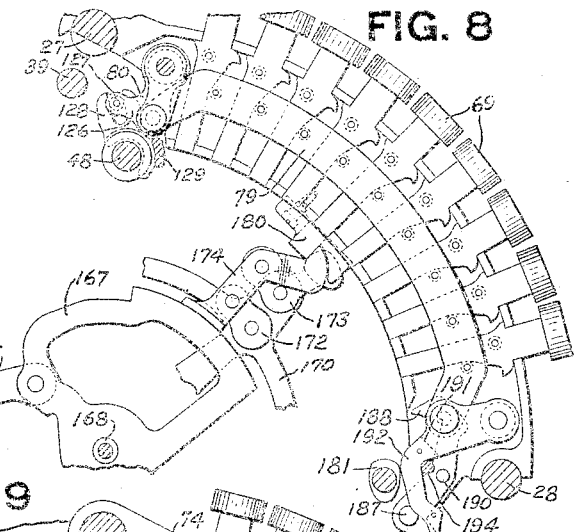
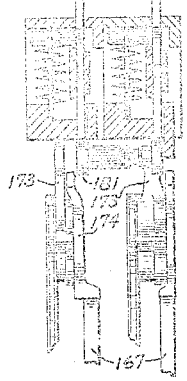
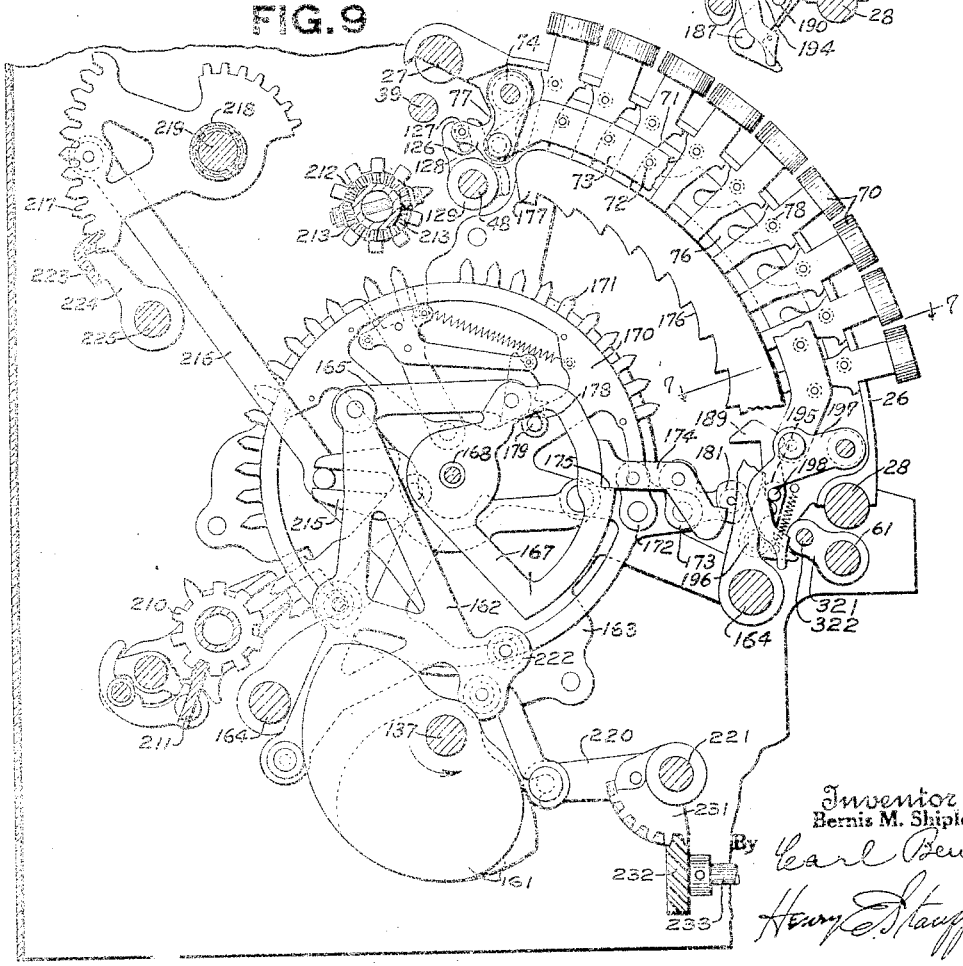

Mar. 5, 1929.  B. M. SHIPLEY  1,703,958
CASH REGISTER
Filed Sept. 12, 1923   9 Sheets-Sheet 4

Inventor
Bernis M. Shipley
By Carl Beust
Henry E. Stauffer
His Attorneys

Mar. 5, 1929.  B. M. SHIPLEY  1,703,958
CASH REGISTER
Filed Sept. 12, 1923   9 Sheets-Sheet 5
FIG. 18
FIG. 17
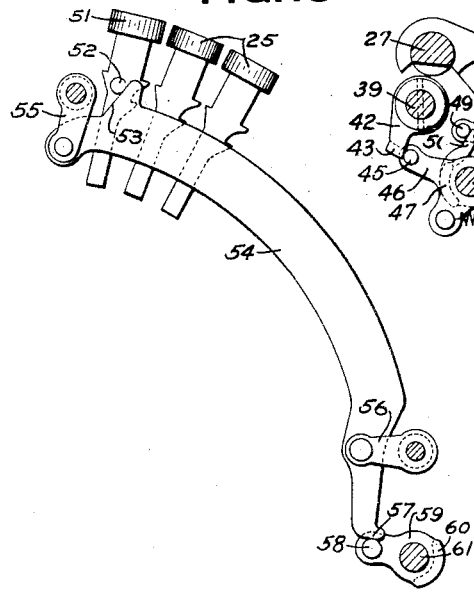
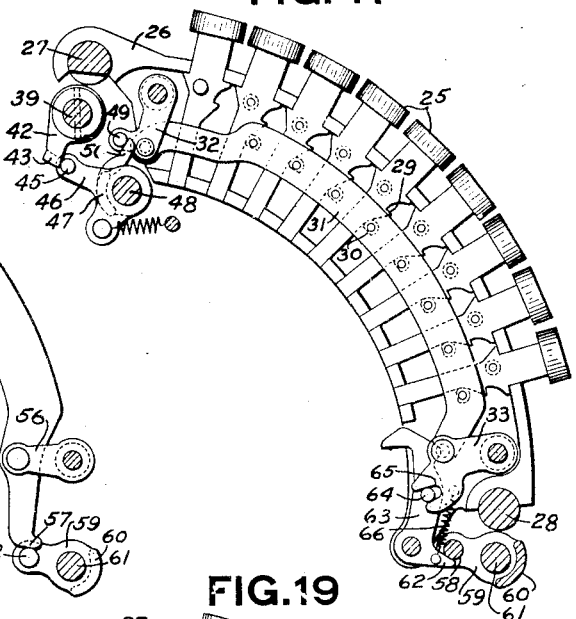
FIG. 20
FIG. 19
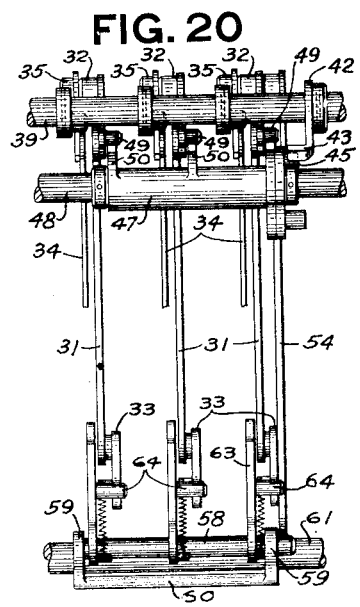
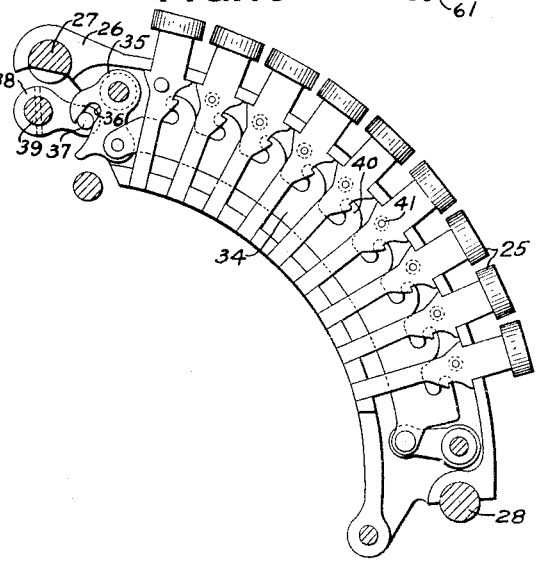
Inventor
Bernis M. Shipley
By
His Attorneys Mar. 5, 1929.
B. M. SHIPLEY
1,703,958
CASH REGISTER
Filed Sept. 12, 1923
9 Sheets-Sheet 6
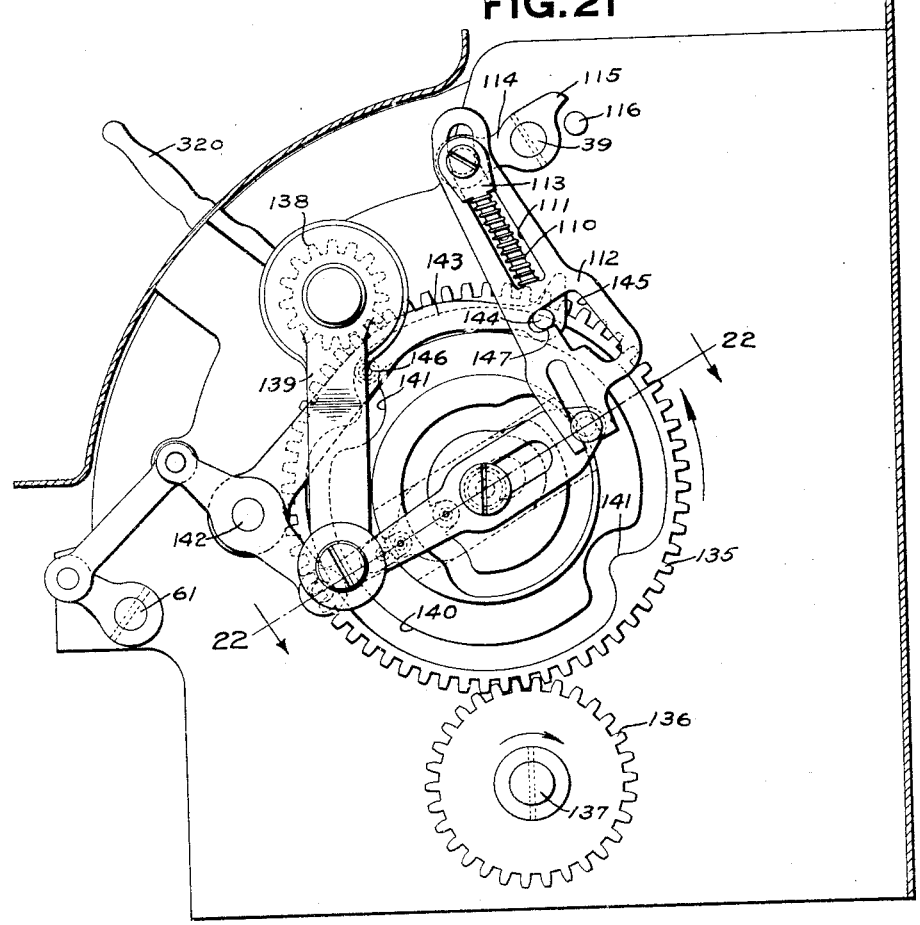

Mar. 5, 1929.  B. M. SHIPLEY  1,703,953
CASH REGISTER
Filed Sept. 12, 1925  9 Sheets-Sheet 8
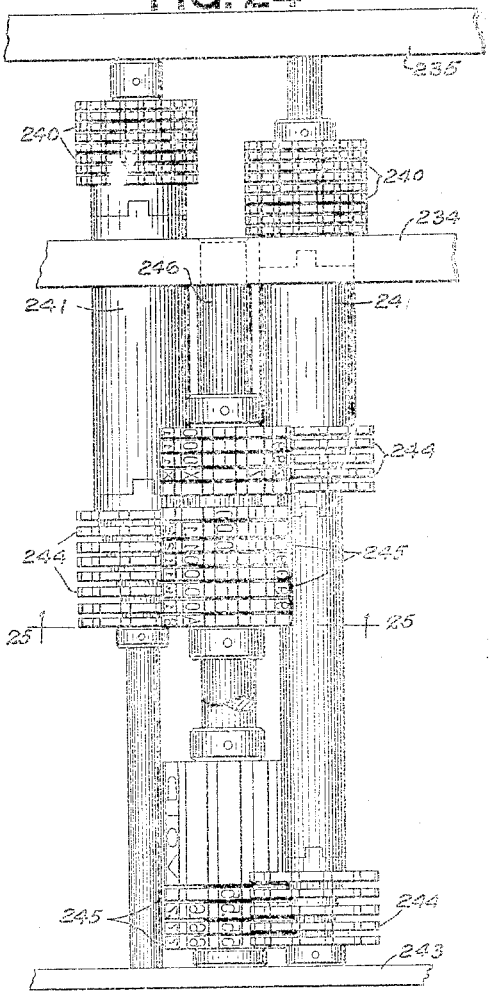
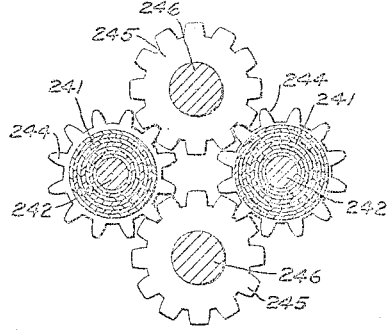

Mar. 5, 1929.  B. M. SHIPLEY  1,703,958
CASH REGISTER
Filed Sept. 12, 1923  9 Sheets-Sheet 9
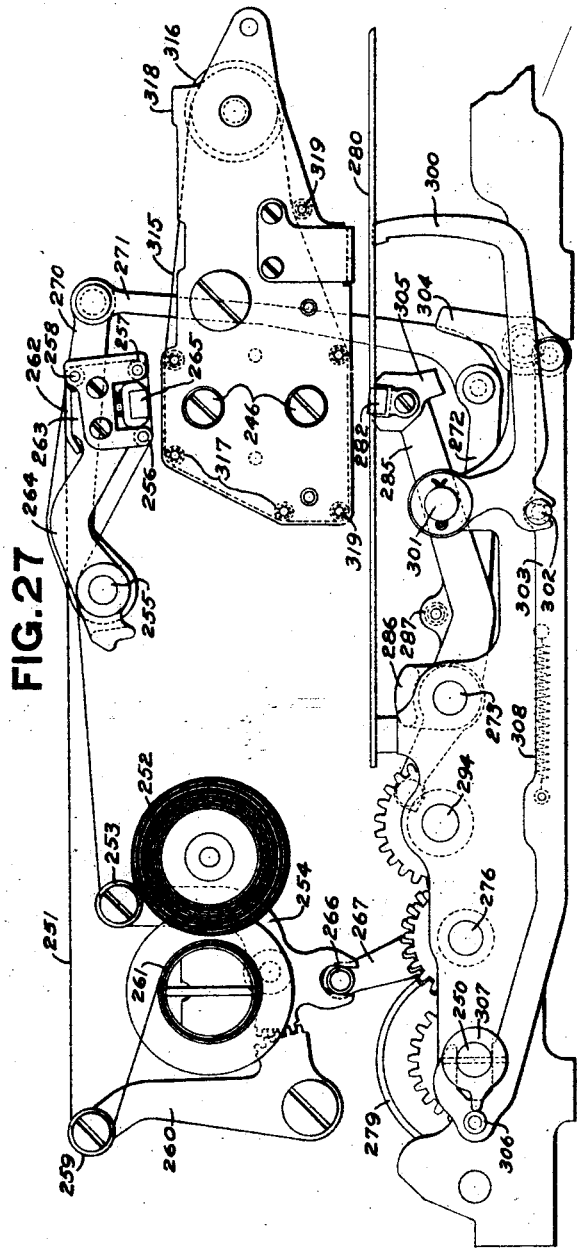
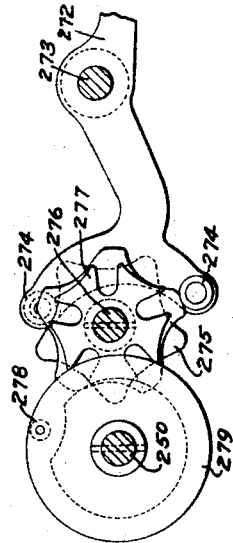
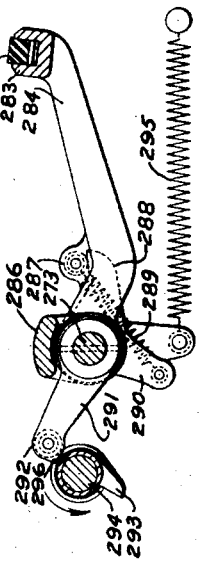
Inventor
Bernie M. Shipley
By Earl Beust
Henry E. Stouffer
His Attorneys Patented Mar. 5, 1929.

1,703,958

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed September 12, 1923. Serial No. 662,207.

This invention relates to cash registers.

One object of the present invention is to provide a machine for use by checkers in hotel dining rooms, restaurants, and the like to keep account of the food delivered by the kitchen to the dining room.

It is another object of the invention to simplify the operation of the machine to the greatest possible extent.

Another object is to so construct the machine that the depression of a key in one amount bank will control the operation of two differential units.

With these and incidental objects in view, the invention consists of certain novel features of construction and combinations of parts, the essential elements of which are set forth in appended claims and preferred form or embodiment of which is hereinafter described with reference to the drawings which accompany and form part of this specification.

Of said drawings:

Fig. 1 is a diagrammatic view of the keyboard of the machine.

Fig. 2 is a facsimile of the guest's check adapted for use with this machine.

Fig. 3 is a facsimile of the back of the check, showing the manner in which a "Void" transaction is printed thereon.

Fig. 4 is a section taken through the machine just to the left of the "Void" bank.

Fig. 5 is a detail view of the detent operated by the "Void" key.

Fig. 6 is a detail view of the detent operated by the 5¢ and release keys in the "Void" bank.

Fig. 7 is a detail sectional view, taken substantially on the line 7—7 of Fig. 9, showing how the latch in the "Even cents" bank is controlled by the "Odd cents" bank.

Fig. 8 is a detail section taken beside the "Odd cents" bank, and shows the permanent stop carried thereby.

Fig. 9 is a section taken just to the left of the "Even cents" bank, looking towards the right.

Fig. 17 is a detail side elevation of the highest order waiters' bank of keys.

Fig. 18 is a detail view of the detent and key for releasing all of the waiters' keys simultaneously.

Fig. 19 is a detail side view of a waiters' bank, showing the locking detent therefor.

Fig. 20 is a rear elevation of the three banks of waiters' keys and their cooperating mechanisms.

Fig. 21 is a right hand side view of the machine.

Fig. 22 is a detail section taken on line 22—22 of Fig. 21.

Fig. 24 is a detail top plan view of the tube lines and type wheels used herein.

Fig. 25 is a detail sectional view taken through the tube lines substantially on the line 25—25 of Fig. 24.

Fig. 26 is a facsimile of the detail strip printed by the present machine.

Fig. 27 is a front elevation of the printing mechanism.

Fig. 28 is a detail side elevation of the hammer for printing on the guest's check and the mechanism for operating it.

Fig. 29 is a detail side view showing the means for actuating the upper impression mechanism.

Figure 11:
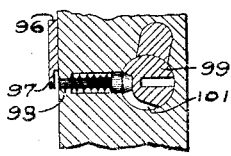
Fig. 11 is a detail section taken on line 11—11 of Fig. 12.

General description.

In hotel dining rooms, restaurants, and the like, an attendant known as a "checker" is usually employed. This checker is stationed near the entrance from the kitchen to the dining room and her duty is to check the food coming in from the kitchen to see that it corresponds with what has been ordered and that the prices are correct.

The customer's order is written on a printed check such as shown in Fig. 2. The waiter takes the order to the kitchen, where it is filled. He then returns with the food and stops at the checker's desk. The checker places the check in the machine and then depresses the keys representing the waiter's number. These keys are so constructed that they will remain depressed until either a release key or another waiter's key is depressed, so that it is only necessary to depress the waiters' keys on the first entry of the series.

The price of the item is then entered by depressing the proper amount keys. The machine has a bank of keys in which the 5-cent key is located, and another bank of keys in which the values of all of the keys end in 5-cents. A third bank is also provided, which contains all the even dime keys, that is, the 10, 20, 30, 40, 50, 60, 70, 80 and 90 cent keys. Depression of a key in any of these three banks controls the release mechanism of the machine, so that it will be released and the circuit closed through the electric motor, which will immediately operate the machine. A lock is provided for each checker's key, so that the checker on duty can depress and lock her key in depressed position when she first takes her place, and maintain it depressed until she leaves, so that it is unnecessary to depress this key on every operation.

If the amount of an item is in even dollars, such for instance as the first item on the facsimile of the check shown in Fig. 2, it is necessary to press a special release key R which will release the machine for operation.

It sometimes happens that food is returned, and when this occurs the procedure is as follows: the check on which the order was originally placed is inserted in the mechine and the machine released by the above mentioned release key, which prints a plurality of zeros over the previously printed amount corresponding to the goods returned. This is shown in the third item in Fig. 2. The card is then removed, turned over, and reinserted in the machine, the price of the goods returned is set up on the amount keys, and the "Void" key is depressed, whereupon the amount and the word "Void" are printed on the back of the slip, as is shown in Fig. 3.

There are only two totalizers used in the present machine. One of the totalizers, which will be known herein as the "Total service" totalizer, is engaged with the actuating mechanism on every adding operation. The other totalizer is what is known in the art as an adding and subtracting totalizer, that is, it has both adding and subtracting pinions which are capable of being moved into engagement with the actuating means. It will be known herein as the "Net service" totalizer. Normally the adding elements of this totalizer are in position to be engaged by the actuating means so that amounts set up on the keyboard are normally added into this totalizer. When, however, the "Void" key is depressed, the totalizer is automatically shifted so that the subtracting pinions thereof are in position to engage the actuating means and the adding elements are rotated backwardly to the extent of the amount set upon the keyboard, as will be more fully described later on.

*Waiters' keys.*

There are provided herein three banks of waiters' keys 25 (Figs. 1, 17, 18 and 19). These keys of each bank are slidably mounted in a key frame 26 supported by two rods 27 and 28 carried by the machine side frames in a manner well known in the art. Each of the keys 25 has a shoulder 29 formed thereon adapted to cooperate with a pin 30 carried by a detent 31 supported by links 32 and 33 pivoted to the key frame 26 (Fig. 17). When any of the waiters' keys 25 is depressed, the beveled face of the shoulder 29 will move the detent 31 downwardly until the shoulder on the key has passed the pin, whereupon the detent will be returned to its normal position by a spring 66 to be later described, and will thereby hold the key in its depressed position. A locking plate 34 (Fig. 19) is also provided which is identical with the locking plates shown in the patent to Fuller No. 1,242,170, granted Oct. 9, 1917, for the purpose of locking the keys in their depressed position during an operation of the machine. In Fig. 19 the locking plate 34 is shown in its normal position. At its upper end this detent is pivoted to a link 35 which has a slot 36 cooperating with a pin 37 carried by an arm 38 fast on a release shaft 39. When the machine is released, as will be hereinafter described, the release shaft 39 is rocked counter-clockwise (Fig. 19), which movement, through the slot and pin connection above mentioned, will rock the link 35 clockwise and will move the locking plate 34 upwardly so that one of a plurality of hooks 40, carried thereby, which corresponds with the key depressed, will engage a pin 41 carried by said key, and thereby lock the key in its depressed position. The hooks 40 corresponding to the undepressed keys will be moved beneath the pins 41 and will thereby prevent any of the undepressed keys from being depressed until the mechanism is again in its home position.

Means are provided to prevent the release of the machine unless one or more of the waiters' keys is depressed. Fast on the release shaft 39 is an arm 42 (Fig. 7), having a flange 43 so formed as to normally contact a pin 45 carried by an arm 46, fast on a yoke 47, loosely mounted on a shaft 48 which is supported by the machine side frames. The link 32 which carries the upper end of the detent 31 previously mentioned has an extension carrying a pin 49 adapted to cooperate with an arm 50 also fast on the yoke 47 (Figs. 17 and 20). There is one of these arms 50 for each bank of waiters' keys. It is evident from Fig. 17 that so long as the pin 45 lies in the path of the flange 43 of the arm 42 it is impossible to release the machine, as the release shaft 39 cannot be rocked in a counter-clockwise direction. If, however, a key in any of the banks of waiters' keys is depressed the pin 49, through its engagement with the arm 50, rocks this arm, the yoke 47, arm 46 clockwise far enough to remove the pin 45 from the path of the flange 43 to permit the arm 42 and the release shaft 39 to rock counter-clockwise to release the machine.

No means is provided for releasing the waiters' keys at the end of an operation, as it is desirable to have them remain in their depressed position until all of the items which constitute the guest's order have been entered by the checker. When another waiter presents his order to be checked, the checker need only depress the keys corresponding to the new waiter's number and the keys corresponding to the number of the previous waiter will be automatically released. This feature is old and well known in the art and the means for accomplishing it is shown in Fig. 17. It is evident that when any key in the waiters' bank is depressed and the detent 31 is moved downwardly, as previously described, any key which may have been previously depressed will be released as soon as the pin 30 on the detent is removed from the shoulder 29 on the key and the key will thereupon be returned to its normal undepressed position by a spring not shown If, for any reason, it is desired to release the waiters' keys, a release key 51 (Figs. 1 and 18) can be depressed. This release key is located in the "9" position of the left hand bank of waiters' keys. It carries a pin 52 which cooperates with an inclined surface 53 formed on a release bar 54 pivotally carried by links 55 and 56 supported by the key frame for this bank. The key release bar 54 has at its lower end a foot 57 which normally lies just above one end of a rod 58, carried by two arms 59 of a yoke 60, loose on a shaft 61 supported in the machine side frames. The rod 58 cooperates with projections 62 of zero stop pawls 63, one for each of the banks of waiters' keys. These pawls 63 are pivotally mounted on the key frames 26 for their respective banks, and carry pins 64 which are embraced by bifurcations 65 of the links 33, which links support the lower end of the latching detent 31 for each bank of waiters' keys, as above mentioned. From the above description it can be seen that when the release key 51 is depressed the release bar 54 is moved downwardly, and, due to the engagement of the foot 57 with the rod 58, the arms 59 and yoke 60 are rocked counter-clockwise about the shaft 61. This movement of the rod 58 rocks the zero stop pawls 63 clockwise and, due to the connection between the pawls 63 and their corresponding links 33, rocks these links counter-clockwise, and thereby lowers the detents 31 sufficiently to release any keys which may have been depressed Each zero stop pawl 63 is normally held in the position shown in Fig. 17 by means of a spring 66 extending between a pin on the projection 62 of the pawl and a pin carried by the key frame 26

Dollars keys.

The two banks of dollars keys shown in Fig. 1 are of the usual type used in machines of this class, and no further description or illustration of them is thought necessary herein, as they are completely shown in the above-mentioned patent.

Even cents keys.

The bank next to the right from the units of dollars bank will be known herein as the "Even cents" bank. This bank contains nine keys 70, from 10¢ to 90¢ (Figs. 1 and 9). These keys 70 are mounted in a key frame 26 identical with the key frame for the waiters' keys above described. Each of the keys 70 has an inclined surface 71 adapted to cooperate with a corresponding pin 72 carried by a detent 73 (Fig. 9) which is movably supported by two links 74 and 197 pivoted to the key frame. It can be seen that the depression of one of these keys 70 will move the detent 73 downwardly. The purpose of this movement will be hereinafter described.

Figure 15:
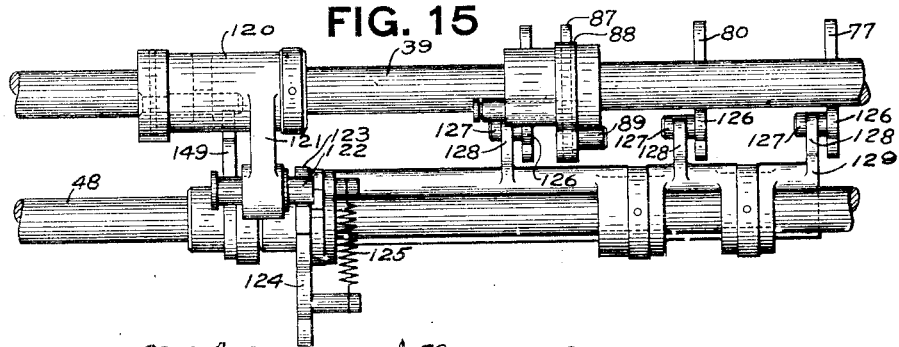
Fig. 15 is a detail rear elevation of a portion of the release shaft and its cooperating mechanism.

This bank of keys is one of three banks adapted to release the machine. A machine release bar 76 (Fig. 9) carried at its upper end by a link 77 (Figs 9 and 15) and at its lower end by a link (not shown), has curved slots formed therein which are adapted to cooperate with pins 78 carried by the keys. When a key is depressed, its pin 78 enters a slot in the machine release bar 76 and moves it downwardly and releases the machine in a manner to be later described in connection with the description of the release mechanism.

"Odd cents" keys.

In the position usually occupied by the units of cents bank of keys there is a bank of keys 69 from 15¢ to 95¢ in multiples of 5¢. These keys cooperate with a detent 79 (Fig. 8) which is identical with the detent 73 for the "Even cents" bank and the function of which will be presently described. As these keys 69 are release keys, this bank of keys is also provided with a machine release bar identical with machine release bar 76, but not shown herein. A link 80 identical with link 77 carries the upper end of the machine release bar of this bank and cooperates with the release mechanism in a manner to be later described.

"Void" bank.

The next bank to the right (Fig. 1) will be known herein as the "Void" bank. It contains the "5¢" key which is depressed when only five cents are to be registered. This bank also carries the "Void" key which is depressed when any article entered on the check is returned for credit. The other key in this bank is the "Release" key, which will be operated to release the machine when only dollars are entered and also to release the machine on totalizing operations.

There are three release bars 81, 82 and 83 cooperating with this bank. In Fig. 4 the left hand bar 81 is shown. In Fig. 5 the center bar 82 is illustrated, while in Fig. 6 the right hand bar 83 is illustrated. It can be seen that due to the shapes of the notches or recesses therein the bar 81 will be operated only by the 5¢ key. The bar 82 will be operated only by the "Void" key, and the bar 83 by both the 5¢ and the release key, but not the void key.

The chief function of bar 82 is to maintain the void key in its depressed position when it is depressed. This bar is carried by the pivoted links 84 and 85. The link 84 has a nose 86, which, when the bar 82 is moved downwardly by the depression of the void key, is adapted to cooperate with a notch formed in an arm 87 which is loose on the release shaft 39. The bar 82 will thereby be held in its lowered position, which will hold the void key depressed.

Near the end of an operation of the machine the release shaft 39 is moved clockwise (Fig. 5) slightly past normal position and then counter-clockwise to normal. An arm 88 is fast on this release shaft, and when the shaft is rocked clockwise as above described, the said arm 88 will come into contact with a pin 89 carried by arm 87, and will thereby disengage the notch in this arm 87 from the nose 86 on link 84 and therefore this arm and the bar 82 can resume their normal positions, as shown in Fig. 5, under the influence of a spring 90, the action of which is well understood in the art.

Checkers' keys.

The extreme right hand bank (Fig. 1) are checkers' keys 96. They control the setting-up of the initial of the checker on duty in order to print the same on the detail strip. These keys also control the setting of the indicator to expose the initial of the checker on duty in a manner well known in the art.

Figure 10:
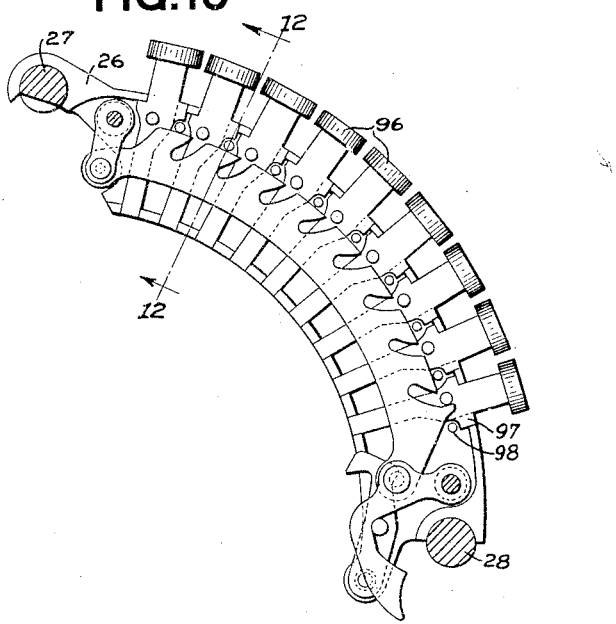
Fig. 10 is a detail side elevation of the bank of "Checker's" keys.
Figure 12:
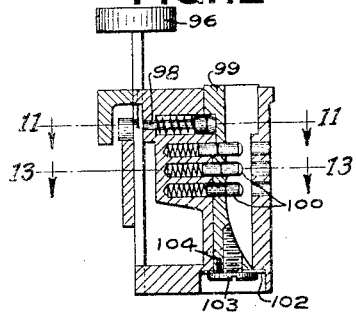
Fig. 12 is a detail sectional view taken on line 12—12 of Fig. 10, and shows the mechanism for locking the checker's keys in either their depressed or undepressed positions.
Figure 13:
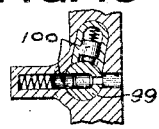
Fig. 13 is a section taken on line 13—13 of Fig. 12.
Figure 14:
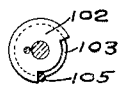
Fig. 14 is a detail view of the stop for limiting the movement of the locks, such as shown in Fig. 12.

Each of the checkers' keys is controlled by a lock with an insertible key which is given to the individual checker corresponding thereto. Like the other banks of keys, the checkers' keys are slidably supported by a key frame 26 (Fig. 10). Each of the keys has a lug 97 formed thereon. A spring-pressed plunger 98 (Figs. 10, 11 and 12) is located in the key frame adjacent each key 96, and when the lock is locked prevents the depression of its key. The lock is provided with the usual key barrel 99 and tumblers 100. The key barrel has a recess 101, as shown in Fig. 11, to receive the inner end of the plunger 98. As shown in this figure, the lock is unlocked and the key may be depressed. When, however, the appropriate key is inserted and the key barrel rotated thereby in a clockwise direction (Fig. 11), the plunger 98 will be forced outwardly and will pass beneath or above the lug 97 on the key appropriate thereto, which will lock this key against movement in either direction. That is, it may be locked against depression during the absence of the checker corresponding thereto, or it may be locked in depressed position, thereby making it unnecessary for the checker to press this key on every operation. A disk 102 is fastened to the bottom of the key barrel by a screw 103 and a pin 104 and has a recess in its periphery (Fig. 14) which receives a pin 105 projecting downwardly from the frame. When the key barrel is turned, the disk 102 is carried thereby and when the end of the recess thereof comes into contact with the pin 105 the movement of the key barrel will be stopped in the correct position.

Release mechanism.

As is well known in the art, and shown in Fig. 21, the release shaft 39 is constantly under the tension of a spring 110, which is compressed between the end of an opening 111 in a link 112, and a shoulder formed on each of a pair of pilot guides 113. These guides are pivoted to an arm 114 fast on the release shaft 39. The spring 110 will, when the shaft is released, rock it clockwise (Fig. 21) until a nose 115 of the arm 114 comes into contact with a pin 116 on the side frame.

Fast on the release shaft 39 is an arm 117 (Fig. 4) carrying a pin 118 which normally rests just beneath an arm 119 fast on a hub 120 loose on the release shaft 39. Three bifurcated arms 128 (see also Figs. 8, 9 and 15) are carried by a yoke 129 to which is also fastened the arm 123. It can be seen that whenever a key is depressed in the even or odd cents banks the release bar appropriate thereto will be moved downwardly, which will rock the link 77 (Fig. 9), or the link 80 (Fig. 8), or the link 130 (Fig. 6), counter-clockwise, corresponding with the bank in which the key is depressed, this movement through mechanism to be presently described rocking the yoke 129 and therefore the arm 123 clockwise (Fig. 4) far enough to remove the arm 123 from the path of a half-round stud 122 carried by a downwardly extending arm 121 (Figs. 4 and 15) of the hub 120. This stud 122 normally contacts the flat end of arm 123.

As long as the stud 122 contacts the arm 123, the arm 119 will prevent the rocking of the release shaft 39 due to the engagement of this arm with the pin 118 on arm 117. When the machine is to be released, however, the arm 123 is rocked clockwise by depression of a key, in the manner to be presently described, far enough to remove it from the path of the pin 122, whereupon the spring 110 will rock the release shaft 39 counter-clockwise (Fig. 4), and the stud 122 will assume a position between the arm 123, and an arm 124 loose on shaft 48 and connected to arm 123 by a spring 125.

The means for rocking the arm 123 will now be described. This movement is accomplished by the depression of a key in the even cents bank, a key in the odd cents bank, or either the 5¢ key or lease key in the "Void" bank. It will be recalled that both the even and odd cents banks are provided with release bars. These bars are pivoted to links 77 and 80 respectively above mentioned. Each of the links 77 and 80 and a similar link 130 for the "Void" bank has a projection 126 (Figs. 6, 7, 9 and 15) carrying a pin 127 each of which is embraced by one of arms 128, fast on the yoke 129 loosely mounted on shaft 48. When one of the release bars 76 or 83, is moved the yoke 129 will be rocked clockwise and therefore the arm 123 which is fast thereon will be rocked out of the path of the stud 122 on arm 121 and the release of the machine will be thereby permitted.

Restoration of release mechanism.

Near the end of the operation of the machine the release shaft 39 is rocked counter-clockwise (Fig. 21) slightly beyond normal position and then clockwise to normal. This movement is accomplished in the following manner. Mounted on the right hand side frame of the machine is a gear 135 which meshes with another gear 136 fast on the end of a shaft 137, supported by the machine frames, and which is the main drive shaft of the machine. The gear 135 also meshes with a small gear 138 which is directly connected with a crank handle 139 used to operate the machine in the absence of the usual electric motor.

The large gear 135 receives only a one-half rotation upon every operation of the machine. Cut in the side of this gear is a cam groove 140 with two identically formed nodes 141 diametrically opposite each other. Pivoted on a stud 142 in the side frame is an arm 143 carrying at its end a pin 144 projecting through an opening 145 in the link 112. The arm 143 also carries a roller 146 cooperating with the cam groove 140.

It is evident from the above that near the end of the one-half rotation of gear 135 one of the nodes 141 of slot 140 will cooperate with the roller 146 and rock arm 143 clockwise. This movement of arm 143, through the engagement of pin 144 thereon with a shoulder 147 formed in the opening 145 of link 112, will cause this link to be lowered. This movement of the link 112 will rock arm 114 and release shaft 39 counter-clockwise slightly past normal and then back to normal.

When the release shaft 39 is rocked clockwise (as seen in Fig. 4) the pin 118, previously described, carried by arm 117 comes into engagement with a surface 148 of a restoring lever 149 loose on shaft 48. This lever has a tail engaging with an extension of the stud 122 (Fig. 15) so that when the release shaft 39 and arm 119 are rocked clockwise (Fig. 4) the restoring arm 149 will also be rocked clockwise. The tail thereof will force the arm 121 clockwise far enough to permit the arm 123 to be returned to its normal position with its end in engagement with the half-round stud 122, whereby the release shaft 39 is held against rotation until the machine is again released.

Differential mechanism.

With a few exceptions, which will be hereinafter pointed out, the differential mechanism of this machine is like that of the patent above referred to. For this reason, only a very brief and general description thereof will be given herein.

As can be seen from Figure 9, each differential unit is driven by a pair of cams 161 which cooperate with a pair of rollers carried by a Y-shaped lever 162 which is pivoted to the differential unit supporting frame 163, as is well known in the art. All of the differential units are supported on two rods 164. At its upper end the lever 162 is connected by a link 165 to a driving segment 167 pivoted on a bushing 168 mounted in the supporting frames 163.

The cams 161 are fast on shaft 137, which is the main drive shaft of the machine, and which receives a complete counter-clockwise rotation (Fig. 9) at each operation of the machine. The rotation of the cams 161 rocks the Y-shaped lever 162 counter-clockwise and then clockwise and therefore the driving segment 167 is moved first counter-clockwise and then clockwise by means of the link 165.

Also loosely mounted on the bushing 168 is a substantially circular totalizer actuator 170 having teeth 171 adapted to be engaged with and drive the selected totalizer wheels. The totalizer actuator 170 carries a link 172 and a bell crank 173 which in turn carry a latch 174. This latch normally rests on a shoulder 175 cut in the driving segment 167 and causes the totalizer actuator 170 to be moved with the driving segment 167. As the totalizer actuator 170 moves upwardly, the outer end of the bell crank lever 173 will come into contact with the inner end of whichever one of the keys of its appropriate bank has been depressed. This will cause the latch 174 to be disconnected from the shoulder on the driving segment 167 so that the totalizer actuator 170 will stop in a position commensurate with the value of the key depressed while the driving segment 167 will continue its movement to the full extent. When the latch 174 is disconnected in this manner the forward end thereof engages one of a plurality of notches 176 formed on the inner periphery of a segmental plate 177 carried by the differential supporting frames. When the driving segment 167 is given its clockwise movement to normal position, a surface 178 thereof comes into contact with a pin 179 carried by the totalizer actuator 170 and moves this actuator in a clockwise direction to its home position. Springs (not shown herein) are provided for returning the latch 174 to its normal position in contact with the shoulder 175 when the shoulder comes opposite the rear end of the latch on its return or clockwise movement.

It will be remembered that in the present machine there is a bank of "Even cents" keys, that is, 10, 20, 30, etc., and also a bank of "Odd cents" keys, that is, 15, 25, 35, etc. The differential mechanism appropriate to the even cents bank of keys will operate in the normal manner, as above described and as is very well known in the art. A slightly different construction is necessary, however, in the odd cents bank. In this bank a permanent stop 180 (Fig. 8) is provided in the "5" position, to control the differential in the "Odd-cents" bank so that the bell crank 173 for this bank will come into contact with the stop 180, to disconnect the totalizer actuator in the "5" position when a key in this bank is depressed, or when this differential is released for operation by depressing the "5" key in the first bank. This will cause the latch 174 to be moved (Fig. 8) until the end thereof occupies a notch in the stop 180. This stop is placed opposite the "5" position on the keybank, so that when the differential mechanism for the odd cents bank is operated it will register "5". As can be seen in Fig. 7, the latch 174 for the odd cents bank is so located that it cannot contact with the inner ends of the keys depressed in this bank and therefore the depression of one of the odd cents keys will have absolutely no effect upon the differential mechanism appropriate thereto, as the latch for this mechanism is disconnected from its driver by the permanent stop 180.

From the above it can be seen that upon the depression of a key in the odd cents bank, 5¢ of the amount appropriate to the key depressed will always be registered upon the units wheel of its corresponding totalizer by means of the units differential mechanism appropriate to the odd cents bank. It is, however, necessary to register the ten's on the ten's wheel of the totalizer under the control of the key depressed in the odd cents bank. In other words, if 45¢ is to be registered, the 45¢ key will be depressed in the odd cents bank. The differential mechanism appropriate to this bank will register 5¢, due to the permanent stop 180 carried by this bank, and 40¢ will be registered on the ten's wheel of the totalizer by the differential mechanism appropriate to the even cents bank. This is done in the following manner: The bell crank 173 for the even cents bank has a laterally extending stud 181 (Fig. 7), the extreme end of which lies in the same vertical plane as the keys of the odd cents bank. It is apparent from an inspection of Fig. 7 that when a key is depressed in the odd cents bank, the extension 181 of the bell crank 173 will strike the inner end of the depressed key and cause the latch of the differential mechanism appropriate to the even cents bank of keys to be disconnected in the position appropriate to the key depressed in the odd cents bank.

The differential mechanism appropriate to the void bank is practically the same as that shown in Fig. 9 and used in connection with the even cents bank. Duplicate reference numerals will be used in Fig. 4 to describe duplicate parts. A driving segment 167 is rocked first counter-clockwise and then clockwise by means of a link 165, a Y-shaped lever 162 and a pair of cams 161 fast on shaft 137, as has been previously described. Differential mechanism for this bank is provided with a latch 174 mounted on an arm 172, and a bell crank 173 and engaging a shoulder on the driving segment 167. The bell crank 173 and the arm 172 are pivoted to an arm 182 which in this bank takes the place of the totalizer actuator 170, shown in Fig. 9, there being no necessity for the said actuator in this "Void" bank, as this differential mechanism does not actuate any totalizer elements. The latch 174 for this bank is adapted to be disconnected from its driver by contact with the inner ends of the "Void" key only shown in Fig. 4. The 5-cent key and the release key R do not displace the zero stop pawl for this bank, thus when either of these two keys is depressed, the differential is stopped by said zero stop pawl.

*Operation of zero stop pawls.*

When the 5¢ key in the "Void" bank (Fig. 4), is depressed its bar 81 is moved downwardly. This bar is pivoted to an arm 184 which is mounted on the key frame. This arm cooperates with a pin 185 projecting laterally from an arm 186 (Fig. 16), fast on a short shaft 187 carried by the key frame of the "Odd cents" bank (Fig. 8). Also fast on this shaft is a zero stop pawl 188 such as is well known in machines of this type. It is the function of this pawl to disconnect the latch of the "Odd cents" differential mechanism in its zero position if no keys in the bank are depressed.

Figure 16:
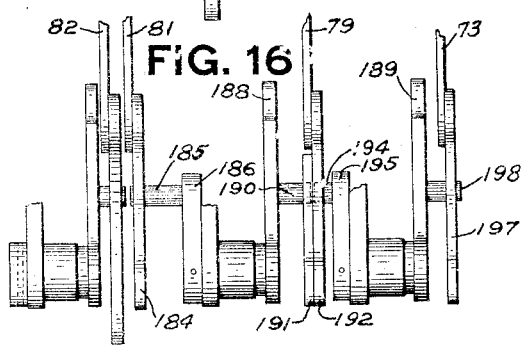
Fig. 16 is a detail rear elevation of the mechanism for controlling the movement, to ineffective position, of the zero stop pawls for the differential mechanisms in the release banks.

It can be seen however that when the 5¢ key is depressed the movement of the bar 81 will rock the arm 184 counter-clockwise, which will rock the pin 185, arm 186, shaft 187 and zero stop pawl 188 clockwise (Figs. 8 and 16). This movement of the zero stop pawl 188 will permit the latch of the "Odd cents" bank to move up five steps and contact the permanent stop 180, above described, to register 5¢ on the appropriate totalizer wheels.

It is evident that when any key in the "Odd cents" bank is depressed both the zero stop pawl 188 for this bank and the pawl 189 for the "Even cents" bank must be moved to ineffective position. The pawl 188 carries a pin 190 which projects to the right (Fig. 16) and lies in the path of a plate 191 riveted to the side of an arm 192 which is pivotally connected to the detent 79 for the "Odd cents" bank. Thus it can be seen that when the detent 79 is lowered due to the depression of a key in this bank the arm 192 will be rocked clockwise. As the plate 191 is fast thereto it will rock the pawl 188 to its ineffective position and permit the latch of the "Odd cents" bank to move up and contact the permanent stop 180.

It is also necessary to rock the pawl 189 appropriate to the "Even cents" bank to its ineffective position when one of the "Odd cents" keys is depressed, as the differential mechanism of the "Even cents" bank registers the tens of the amount to be entered. When, therefore, one of the "Odd cents" keys is depressed and the arm 192 rocked, as above described, this arm comes into contact with a pin 194 projecting laterally from an arm 195 fast on a short shaft 196 carried by the key frame for this bank. The zero stop pawl 189 is also fast on this shaft so that when the arm 192 is rocked counter-clockwise the movement is transmitted through arm 195 and shaft 196 to the pawl 189, which is thereby moved to its ineffective position.

When one of the "Even cents" keys is depressed the detent 73 is moved down. This detent is pivoted to an arm 197 which is similar to arm 192. This arm cooperates with a pin 198 which projects from the pawl 189. Therefore, when the arm 197 is rocked by the depression of one of the "Even cents" keys, the pawl 189 for this bank will also be rocked.

Totalizers.

In this machine only two totalizers are necessary. The totalizer on the back line, which is the "Total service" totalizer (Fig. 9), has one totalizer wheel 210 for each denominational order. In its normal position it is alined by an alining bar 211 which extends across all of the wheels. This aliner is rocked out of engagement from the totalizer wheels when these wheels are moved into engagement with the actuators by means shown and described in the before mentioned patent.

This totalizer is rocked into engagement with the actuators on every operation except a "Void" transaction. The means for controlling the engagement of this totalizer are not shown herein as they are well known in the art.

The "Net service" totalizer, which is located on the upper totalizer line, is identically the same as that shown in the patent above referred to. It has an adding wheel and a subtracting wheel appropriate to each denominational order. Each wheel has fast to its side a bevel gear 212 and located between these wheels and meshing with the bevel gears on both are two bevel pinions 213. The effect of this construction is that the wheels of each pair move in opposite directions. On adding operations the set of adding wheels is rocked into engagement with the actuators. On "Void" operations, however, that is, where food is returned for credit, the totalizer is shifted laterally so that the subtracting wheels are placed in position to be engaged. When these wheels are engaged with the actuators and rotated in an adding direction, the adding wheels will be reversely rotated to the same extent, thereby subtracting the amount of the "Void" transaction from the adding wheels.

It is evident from the above that the difference between the totals on the "Total service" totalizer and the "Net service" totalizer is equal to the total amount of the void transactions.

The usual mechanism is provided for transferring from lower to higher denominational orders. As this mechanism has no bearing on the present invention it will not be described herein.

Indicators.

This machine is provided with the usual indicators. They are not shown herein as they form no part of this invention. The indicators are set by the differential mechanism. Pivoted to the totalizer actuator 170 is a beam 215 (Fig. 9). The end of this beam is bifurcated and cooperates with a pin carried by a link 216. This link is pivoted at its upper end to a toothed segment 217 fast on one of a plurality of sleeves 218 surrounding a shaft 219 supported by the side frames. At its lower end the link 216 is pivoted to an arm 220 loose on a rod 221 also supported by the machine side frames. A roller 222 carried by the Y-shaped lever 162 cooperates with and moves the beam to its proper position, as determined by the differential mechanism, which movement will adjust the link 216 and segment 217 correspondingly. The segment 217 has rigid therewith a segment which is adapted to set the indicators in a manner well known in the art.

*Differential alining mechanism.*

The differential mechanism is alined by means of an alining bar 223 carried by a plurality of arms 224 fast on a shaft 225. The bar is normally in engagement with the teeth of all of the segments 217 and thereby maintains them in alinement. During the first part of the operation of the machine the shaft 225 is rocked counter-clockwise (Fig. 9) by mechanism not shown herein. This movement removes the bar 223 from the teeth of the segment 217 and permits the differential mechanisms to be set. It is then rocked into engagement with segment 217 and thereby alines the differential mechanisms.

*Printer.*

This machine is provided with a printer which is located in the front part thereof.

Figure 23:
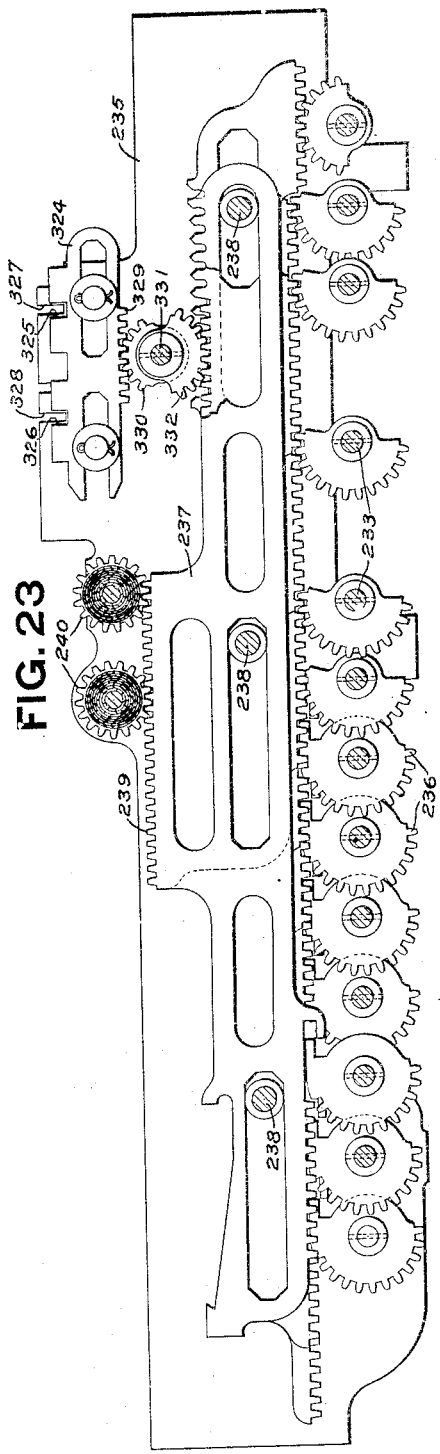
Fig. 23 is a front elevation of the racks for setting up the type wheels.

The type wheels are set up by the movement of the differential mechanisms above described in the following manner. Loose on the rod 221, (Fig. 9), but secured to the arms 220, are a plurality of spiral segments 231 which mesh with spiral pinions 232, each fast on a shaft 233 (Fig. 23) supported by a printer frame 234 (Fig. 24) and by a bracket (not shown) carried by a frame 235. Fast on the forward end of each of the shafts 233 is a segment 236. These segments mesh with teeth formed on a plurality of racks 237 which are slidable transversely of the machine on three studs 238. It can be seen from the above description that when the differential mechanism of the cash register is moved to its various differential extents, the movement will be transferred by means of the beams 215, links 216, arms 220, spiral segments 231, spiral pinions 232, shafts 233 and segments 236 to the racks 237, and therefore these racks will be differentially adjusted in accordance with the depression of the keys on the keyboard.

The racks 237 have teeth 239 which mesh with pinions 240 fast on the inner ends of a plurality of nested sleeves 241 (Figs. 24 and 25). The sleeves 241 are supported by two long studs 242 projecting from the frame 235 and supported at their forward ends by a plate 243. At their forward ends the various tubes 241 carry pinions 244 which mesh with type wheels 245 supported by long studs 246 projecting from the frame 234. It can be seen from the above that the differential movement given the racks 237 will, through the pinions 240, tubes 241 and pinions 244, properly adjust the type wheels 245 in accordance with the values of the keys depressed. As seen in Fig. 25 there are two lines of type wheels, one above the other, and these two lines are set up simultaneously by the pinions 244 which mesh with both lines of type wheels. The upper line is for printing upon the detail strip, while the lower line will print upon an inserted check.

The printer is driven by the cash register and is provided with a main drive shaft 250 (Fig. 27) which is given one complete counter-clockwise rotation upon each adding operation of the cash register by mechanism which is not shown herein but which is old and well known in machines of this type and illustrated in United States Letters Patents, Nos. 1,394,256 and 1,619,796, granted to F. L. Fuller, and B. M. Shipley, respectively, on October 18, 1921 and March 1, 1927 respectively.

*Detail strip.*

This machine prints what is known as a "Detail strip". This is a continuous paper strip upon which all entries made by the machine are printed. A facsimile of a fragmentary portion of the detail strip printed by this machine is shown in Fig. 26. The initial "A" which appears in the first column on the left is the initial assigned to a certain checker. It will be remembered that the checker's key is locked in its depressed position when the checker goes on duty and is left in this position during the period that she remains on duty. The next column to the right shows the various amounts entered by the checker. It will be noticed that the next to the last item has a capital "V" printed beside it. This indicates that this amount is void and has been subtracted from the net service total, as above described. The last item shown on the strip is the total of the amounts entered by checker "A", the X indicating that the total has been printed but that the totalizer has not been cleared. The detail strip 251 (Fig. 27) is carried upon a storage roll 252 supported by the frame 234. It passes from the storage roll about a roller 253 carried by a lever 254 and then extends over a rod 255 which is the pivotal point of the platen. From the rod 255 the strip passes about a roller 256, a second roller 257 and a third roller 258 and then extends toward the left until it passes about a roller 259 carried by an arm 260 from which roller it is wound upon a receiving roll 261. The strip is given a step-by-step feeding movement from the storage roll to the receiving roll by mechanism not shown herein but which is old and very well known in this art and shown in the above mentioned Shipley Patent, No. 1,619,796. The strip is adapted to receive an autographic notation upon a writing table 262 which is carried by a swinging platen frame 263 supported by a pair of arms 264. The platen frame 263 carries a resilient platen 265 for the purpose of making an impression on the detail strip from the upper set of type wheels.

In addition to its step-by-step feed the detail strip is adapted to be shifted from its normal position, in which the last printed item lies just to the left of the writing table 262, about the platen frame 263 to a position in which the next impression can be made from the type wheels and then moved back to its original position and one step farther. This shifting of the paper strip is caused by the lever 254 and arm 260 previously mentioned. As shown in Fig. 27, the lever 254 carries a segment meshing with a segment on the arm 260. The lever 254 is bifurcated and embraces a roller 266 on an arm 267. This arm is rocked clockwise which rocks the lever 254 counter-clockwise about its pivot. Due to the segmental connection between the lever 254 and the arm 260 the arm 260 will also be rocked in a clockwise direction simultaneously with the movement of the lever 254. It is evident that when this action of the parts occurs a slack will be created in the detail strip by the movement toward the right of the roller 259 which at the same time is taken up by the movement toward the left of the roller 258. Therefore, the strip which extends about the platen frame 263 will be shifted from its writing to its printing position. Reverse movement of arm 267 to normal position causes the strip to be moved back to its writing position. When it returns to its writing position after the shift has been accomplished and the impression taken, the feeding mechanism will act to feed the strip one step farther, so that a clear space is in position for the next operation if any autographic notations are to be made.

A single impression is made on the detail strip by the following mechanism. Fast to the inner one of the two arms 264 is a longer arm 270, to which is pivoted a link 271, pivoted at its lower end to a lever 272 (see Figs. 27 and 29). The lever 272 is loosely mounted on a shaft 273 supported by the printer frames, and at its left hand end is forked. Each arm of the fork carries a roller 274, and these rollers cooperate with a pair of cams 275 fast on a shaft 276. Also fast on the shaft 276 is a Geneva wheel 277 which is adapted to cooperate with a pin 278 carried by a disk 279 fast on the main drive shaft of the printer 250. It will be remembered that this shaft is given a complete counter-clockwise rotation upon each operation of the machine and therefore the disk 279 is rotated therewith. When the pin 278 carried by this disk comes into contact with one of the slots in the Geneva wheel 277, said wheel will be rotated until the pin 278 is again disengaged therefrom, which will cause the pair of cams 275 to be given one-fifth of a complete rotation. As these cams cooperate with the lever 272, this lever will be rocked first clockwise and then counter-clockwise to normal position. On the clockwise movement of the lever 272 the link 271 will be lowered and will thereby rock the arm 270 and platen carrying arms 264 clockwise far enough to bring the platen 265 into contact with the type wheels for the purpose of taking an impression upon the detail strip.

Check printing mechanism.

The waiter presents to the checker the customer's order and this is then inserted in the machine by the checker and the amounts of the various items thereon are printed opposite each of said items on the check, as can be seen in Fig. 2. The check is placed upon a table 280 (Fig. 27) which may be provided with any suitable guiding means for facilitating the printing upon the lines of the check. No means is provided for feeding the check between operations of the machine and it is necessary for the checker to position the check properly, with relation to the guide, after each operation.

The impression on the check is made from the lower set of type wheels in the following manner; A resilient platen 282 is carried by a U-shaped bar 283 supported by a pair of arms 284 and 285 (Figs. 27 and 28). The arms 284 and 285 are loose on the shaft 273 and are connected together by means of a yoke 286. The arm 284 has an extension carrying a pin 287 which normally lies just above the end of an arm 288 which is fast on the shaft 273. The arm 288 is held in contact with the pin 287 by a spring 289 extending from the pin 287 to a pin carried by an arm 290 of the arm 288. Also fast on the shaft 273 is a lever 291 which has a roller 292 cooperating with the periphery of a cam 293 fast on a shaft 294. The roller 292 is held against the periphery of this cam by means of a powerful spring 295 stretched between a downwardly extending arm of the lever 291 and a pin on the frame. The shaft 294 is given a counter-clockwise rotation by a train of gearing, not completely shown herein, but which is shown and described in the previously mentioned Shipley patent. The cam 293 rocks the lever 291, shaft 273, and arm 288 clockwise, and the platen 282 will be lowered under the influence of gravity and the spring 289. The mechanism is so designed that when the (extreme) high point of the cam 293 nears the roller, a nose 296 formed on the end of the lever 291 will engage the surface of the cam and raise the roller therefrom. As the cam continues its rotation, the nose 296 will suddenly drop from the high portion of said cam and when this occurs the lever 291, shaft 273, arm 288, arms 284 and platen 282 will be given a very rapid counter-clockwise rotation under the influence of the powerful spring 295 which has been stretched by the action of the cam 293. This rapid counter-clockwise movement of the platen 282 will bring it violently into contact with the lower type wheels and will therefore cause an impression to be made therefrom on the inserted check.

On certain operations, such as totalizing and subtotalizing, it is not desired to have a check in the machine and mechanism is provided so that when this occurs the downward or clockwise movement of the platen is prevented, so that when the arm 288 and lever 291 are given their rapid counter-clockwise rotation by the spring 295 it will have no effect upon the platen 282. This mechanism will now be described. The table 280 is formed with an opening therein through which a feeling arm 300 (Fig. 27) is adapted to pass. This arm is pivoted on a stud 301 and has a bifurcated portion surrounding a pin 302 on a pitman 303. At its right hand end this pitman is pivoted to an arm 304, which, under certain conditions, is adapted to be moved to a position in which its end lies beneath a toe 305 carried by the platen-supporting frame 283. At its opposite end the pitman 303 is bifurcated and is adapted to slide on the shaft 250. It carries a roller 306 which cooperates with the periphery of a cam 307 fast on the outer end of the shaft 250. This cam is of course given a counter-clockwise rotation on each operation of the shaft 250. The pitman 303 tends constantly to move toward the right, due to the action of a spring 308 fastened at one end to the said pitman and at the other end to the frame of the machine.

It can be seen that as soon as the high portion of the cam 307, which is normally in engagement with the roller 306, is moved away therefrom the spring 308 will cause the pitman to move toward the right. As the feeling arm 300 is connected to this pitman it will be rocked in a counter-clockwise direction and the end thereof will pass upwardly through the opening in the table 280. If there is a check in the machine the feeling arm 300 will come into contact with the bottom thereof and will be restrained against movement as the spring 308 is not sufficiently strong to break the paper. If, however, there is no check in the machine, then the feeling arm 300 can pass upwardly to a greater extent and the pitman of course will be permitted to move a greater distance toward the right, as seen in Fig. 27. As the pitman 303 is pivoted to the arm 304 it can be seen that this arm will be rocked counter-clockwise about its pivot a sufficient distance to bring the upper end thereof beneath the toe 305 carried by the lower platen frame 283 and therefore any downward movement of the platen frame will be prevented and no impression will be taken upon the check.

Ribbon mechanism.

A continuous inking ribbon 315 (Fig. 27) is provided for inking both the upper and lower type wheels. It extends from an inking roller 316 about six guide rollers 317 which are supported by a plate 318. Each of the guide rollers is carried by a rod 319 projecting from the frame 234. The inking roller is adapted to be rotated in a step-by-step movement which will feed the ribbon so as to bring a fresh surface opposite the printing wheels on every operation. Any suitable mechanism may be employed to accomplish this feeding movement.

Totalizing interlock.

An interlock is provided between the total lever 320 (Fig. 21) and the amount keys which prevents depression of any amount key when said total lever is out of its adding position. When the total lever is moved a shaft 61 (Figs. 4, 9, 20 and 21) will be rocked counter-clockwise as seen in Fig. 4. Fast on this shaft are a plurality of arms 321 which carry a rod 322. The movement of shaft 61 will place the rod 322 in the path of movement of the lower ends of the arms 184 which support the detents in the amount banks. It is evident that when this occurs it will be impossible to depress any of the amount keys.

It is desired, to make it impossible to depress the "Void" key or any checker's key when the total lever is out of its adding position. To accomplish this the rear printer frame 235 (Fig. 23) carries a laterally slidable plate 324. In this plate are two vertical slots 325 and 326 which are adapted to correspond with two similar slots 327 and 328 cut in said frame 235, when the total lever is in its normal position. The plate 324 has teeth 329 on its lower edge meshing with teeth on a segment 330 fast on a shaft 331. Also fast on this shaft is a segment 332 meshing with teeth on the rack 237 appropriate to the total lever 320. It is evident from the above that the movement of the total lever will slide the plate 324 laterally and the slots therein are so arranged that the slots 327 and 328 in the frame will be blocked except when the total lever is in its adding position.

In Fig. 5 it will be noticed that the bar 82 appropriate to the "Void" key is carried by an arm 85 having a depending tail in alinement with one of the slots in the frame. Also a similar arm carrying the detent for the checkers' keys cooperates with the other slot in the frame. When the total lever is in adding position and the slots are open the bars are free to move down. However when the total lever is moved it is impossible to depress either the "Void" key or a checker's key as both slots 328 and 329 are closed and the tails of the bar arms cannot pass therethrough.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of differentially movable members, a plurality of banks of manipulative means, and means operated by any one of said banks for controlling one of said differentially movable members.

2. In a machine of the class described, the combination of a differentially movable member, two banks of manipulative means, and means controlled by either of said banks of manipulative means for stopping said differentially movable member at a predetermined point.

3. In a machine of the class described, the combination of a differentially movable member, driving means therefor, means for disconnecting said member from said driving means, and a plurality of means for controlling said disconnecting means during adding operations.

4. In a machine of the class described, the combination of a differentially movable member, driving means therefor, means for disconnecting said member from said driving means, and a plurality of banks of manipulative means for controlling said disconnecting means.

5. In a machine of the class described, the combination of a single differentially movable member, and a plurality of banks of manipulative devices for controlling said member.

6. In a machine of the class described, the combination of a single differentially movable member, driving means therefor, a latch for connecting said member and said driving means, and a plurality of banks of depressible keys for breaking said latch.

7. In a machine of the class described, the combination of a single differentially movable member, driving means therefor, a latch, an arm and a bell crank pivoted on said member and supporting said latch, two banks of depressible keys, and a pin carried by said bell crank and adapted to come into contact with a depressed key in either of said banks to rock said bell crank lever and thereby break said latch.

8. In a machine of the class described, the combination of two differentially movable members, driving means therefor, latching means for latching said members to said driving means, two banks of depressible keys one appropriate to each differentially movable member, but both adapted to control but one of said members, and a separate means for controlling the other of said members.

9. In a machine of the class described, the combination of two differentially movable members, two banks of depressible keys one appropriate to each of said members but both adapted to control but one of said members, and a separate means for controlling the other of said members.

10. In a machine of the class described, the combination of two differentially movable members, two banks of depressible keys one appropriate to each of said members but both adapted to control but one of said members, and means for stopping the differential movement of the other of said members at a certain point on every operation of the machine.

11. In a machine of the class described, the combination of two differentially movable members, two banks of depressible keys one appropriate to each of said members but both adapted to control but one of said members, and a permanent stop adapted to limit the movement of the other of said members on every operation of the machine.

12. In a machine of the class described, the combination of two differentially movable members, two banks of depressible keys one appropriate to each of said members but both adapted to control but one of said members, and a fixed stud projecting into the path of movement of the other of said members in order to stop said member at the same point on every operation of the machine.

13. In a machine of the class described, the combination of a differentially movable member, a plurality of banks of depressible keys, and a stud carried by one of said members and cooperating with a plurality of said banks of keys to control said member.

14. In a machine of the class described, the combination of a differentially movable member, two banks of depressible keys, and means controlled by either of said banks of keys for stopping said differentially movable member at a predetermined point.

15. In a machine of the class described, the combination of a differentially movable actuating member, a driving segment therefor, means for disconnecting said actuating member from said driving segment, and a plurality of banks of depressible keys for controlling said disconnecting means.

16. In a machine of the class described, the combination of a differentially movable actuating member, a driving segment therefor, a latch for connecting said actuating member, and a plurality of banks of depressible keys for controlling the disengagement of said latch.

17. In a machine of the class described, the combination of a single differentially movable member, and a plurality of banks of depressible keys for controlling the movement of said member.

18. In a machine of the class described, the combination of a single differentially movable member, and a plurality of banks of depressible keys any one of which is adapted to control the movement of said member.

19. In a machine of the class described, the combination of a single differentially movable member, driving means therefor, a latch for connecting said member and said driving means, and a plurality of banks of depressible keys any one of which is adapted to control the breaking of said latch.

20. In a machine of the class described, the combination of a five cent key, an uneven multiple of five cents bank of keys, a dimes bank of keys, actuators for said last two banks, means for controlling the actuator of said uneven multiple of five cents bank from the five cent key and the keys in the uneven multiple of five cents bank, and means for controlling the actuator of said dimes bank from said uneven multiple of five cents and dimes bank.

21. In a machine of the class described, the combination of a five cent key, an uneven multiple of five cents bank of keys, an actuator for the uneven multiple of five cents bank, and means for controlling said actuator from either said five cent key or said bank.

22. In a machine of the class described, the combination of a five cent key, an uneven multiple of five cents bank of keys, an actuator for the uneven multiple of five cents bank, a fixed stop for said actuator, a zero stop for said actuator, and means actuated by the five cent key or by a key in the uneven multiple of five cents bank for moving said zero stop to ineffective position.

23. In a machine of the class described, the combination of an odd cents key bank, an even cents key bank, actuators therefor, means for controlling the actuator of the even cents bank from the keys of either bank, and means for controlling the actuator of the odd cents bank from a key in the odd cents bank.

24. In a machine of the class described, the combination of an odd cents key bank, an even cents key bank, actuators therefor, zero stop pawls for said actuators, connections for moving both zero stop pawls to ineffective position upon depression of a key in the odd cents bank, a fixed stop for arresting the movement of the actuator of the odd cents bank, and means moved into position by a depression of an odd cents key for arresting the actuator of the even cents bank.

25. In a machine of the class described, the combination of an odd cents key bank, an even cents key bank, actuators therefor, zero stop pawls for said actuators, connections for moving both zero stop pawls to ineffective position upon depression of a key in the odd cents bank, a fixed stop for arresting the movement of the actuator of the odd cents bank, and means carried by the keys of the odd cents bank for arresting the actuator of the even cents bank.

26. The combination of a dimes bank, an uneven multiple of five cents bank, an actuator for said dimes bank, a driving member for said actuator, a latch connecting said actuator to said driving member, and means controlled by a key in said multiple of five cents bank for breaking said latch to control the differential movement of said actuator.

27. The combination of a dimes bank, an uneven multiple of five cents bank, actuators for said banks, a fixed stop for controlling the actuator of the uneven multiple of five cents bank upon depression of any key in said bank, and means controlled by the depression of a key in said uneven multiple of five cents bank for arresting the actuator of the dimes bank in a position corresponding to the number of dimes involved in the amount represented by the key depressed.

28. In a machine of the class described, the combination of a plurality of differentially movable members, driving means therefor, means for latching said differentially movable members to the driving means, means for normally breaking said latching means at zero on every operation, and a bank of manipulative means for moving said breaking means to ineffective position.

29. In a machine of the class described, the combination of a plurality of actuating members, driving segments therefor, means for latching said actuating members to said driving segments, means for normally breaking said latches at zero on every operation, and a bank of depressible keys the depression of any of which will move said breaking means to ineffective position.

30. In a machine of the class described, the combination of a plurality of actuating members, driving segments therefor, means for latching said actuating members to said driving segments, a plurality of zero stop pawls for normally breaking said latches at zero on every operation of the machine, and a bank of depressible keys the depression of any of which will move all of said zero stops to their ineffective positions.

31. In a machine of the class described, the combination of an odd cents key bank, an even cents key bank, actuators therefor, zero stop pawls for said actuators, and connections for moving both zero stop pawls to ineffective position upon depression of a key in the odd cents bank.

In testimony whereof I affix my signature.

BERNIS M. SHIPLEY.